United States Patent [19]

Stahura

[11] E Re. 31,249

[45] Reissued May 24, 1983

[54] CONVEYOR SKIRT BOARD AND HOLDER

[75] Inventor: Richard P. Stahura, Indiana, Pa.

[73] Assignee: Martin Engineering Company, Neponset, Ill.

[21] Appl. No.: 317,471

[22] Filed: Nov. 2, 1981

Related U.S. Patent Documents

Reissue of:

[64] Patent No.: 4,236,628
Issued: Dec. 2, 1980
Appl. No.: 69,163
Filed: Aug. 23, 1979

U.S. Applications:

[63] Continuation of Ser. No. 878,236, Feb. 16, 1978, abandoned.

[51] Int. Cl.[3] ..... B65G 47/04

[52] U.S. Cl. ..... 198/525; 198/836; 222/163; 222/286

[58] Field of Search ..... 198/525, 530, 532, 534, 198/540, 547, 550, 557, 616, 836; 222/163, 285, 286

[56] References Cited

U.S. PATENT DOCUMENTS

| | | | |
|---|---|---|---|
| 2,665,795 | 1/1954 | Holwick | 198/836 |
| 2,983,362 | 5/1961 | Crist | 198/836 |
| 3,707,222 | 12/1972 | Hartley | 198/836 |
| 4,231,471 | 11/1980 | Gordon | 198/836 |

FOREIGN PATENT DOCUMENTS

| | | | |
|---|---|---|---|
| 288937 | 2/1915 | Fed. Rep. of Germany | 198/836 |
| 2416963 | 10/1975 | Fed. Rep. of Germany | 198/525 |
| 1072026 | 6/1967 | United Kingdom | 198/836 |
| 1256691 | 12/1971 | United Kingdom | 198/836 |
| 1566549 | 5/1980 | United Kingdom | 198/836 |

*Primary Examiner*—Joseph E. Valenza
*Attorney, Agent, or Firm*—McWilliams, Mann & Zummer

[57] ABSTRACT

A skirt board and installation arrangement adapted effectively to seal a moving conveyor belt, including skirt board sections interlocked with each other and individually adjustable and removable for replacement, which can be accomplished easily without major tools and without stopping the conveyor belt. The skirt board sections are simple to install individually, or by groups and these operations may be performed while the conveyor belt continues to run and when installed, maintains a proper and effective seal with the belt.

9 Claims, 7 Drawing Figures

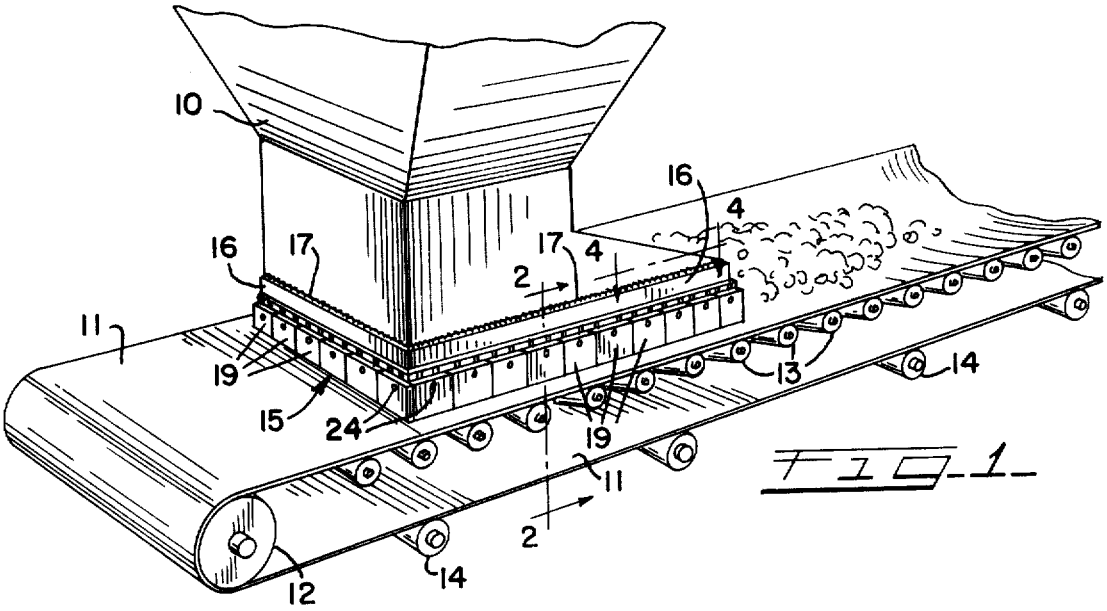
FIG. 1
FIG. 3
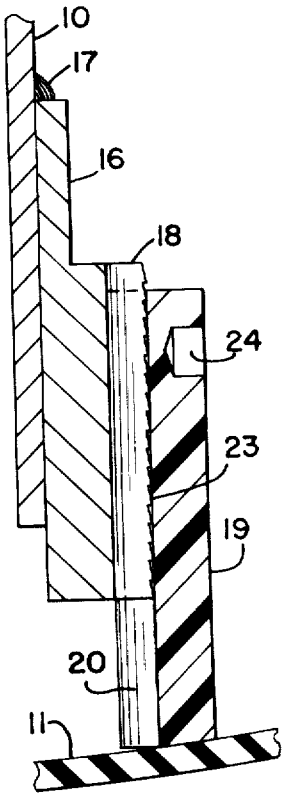
FIG. 2
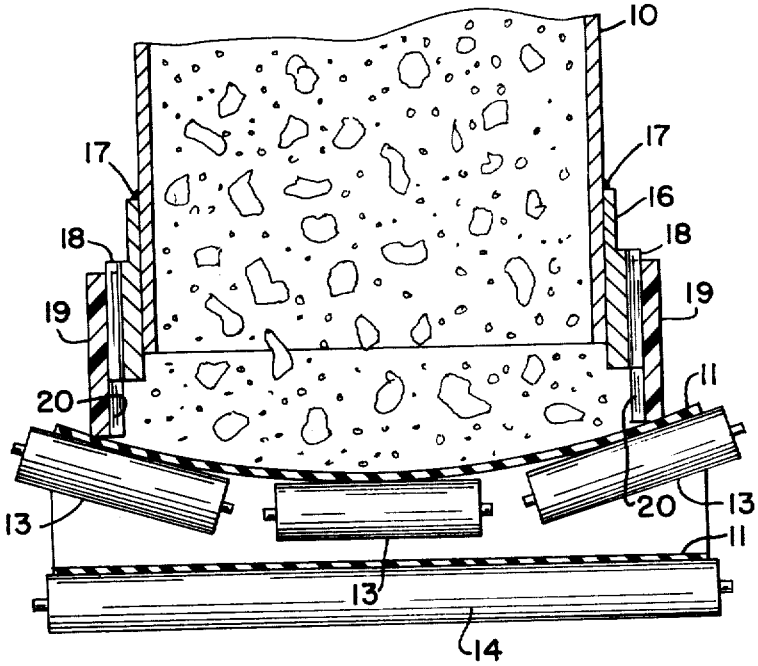

FIG. 4
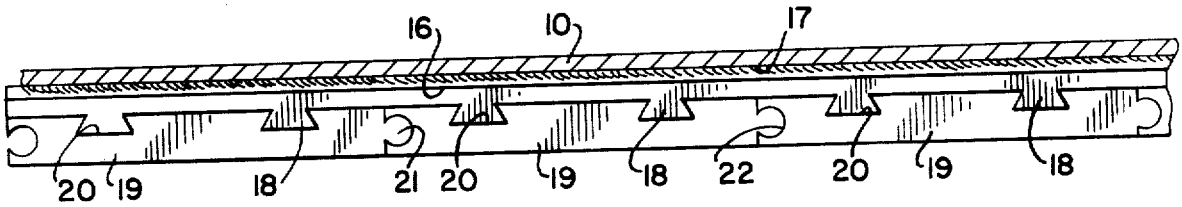
FIG. 5
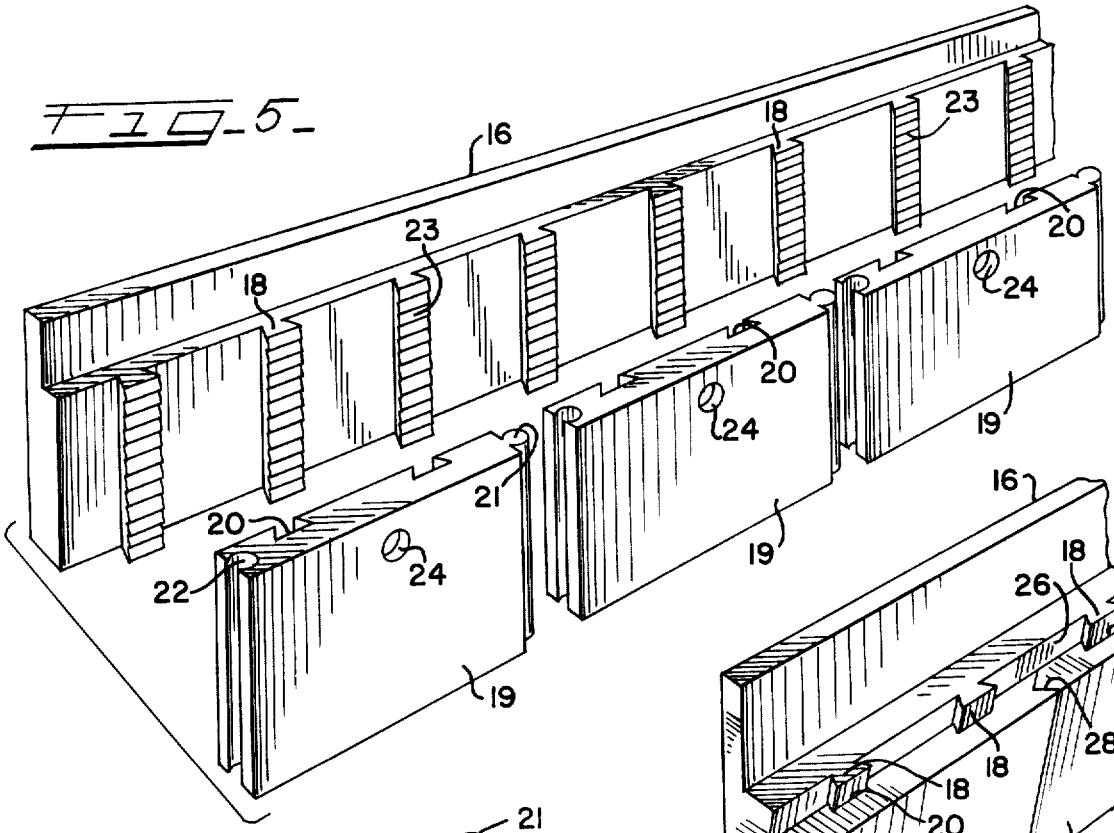
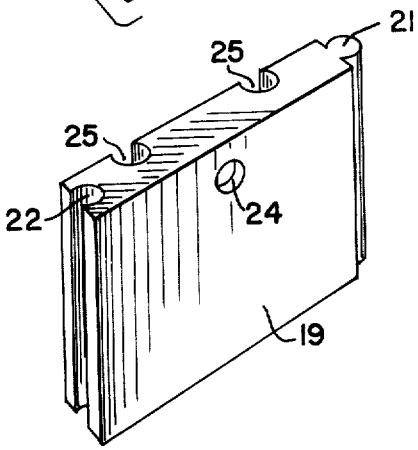
FIG. 6
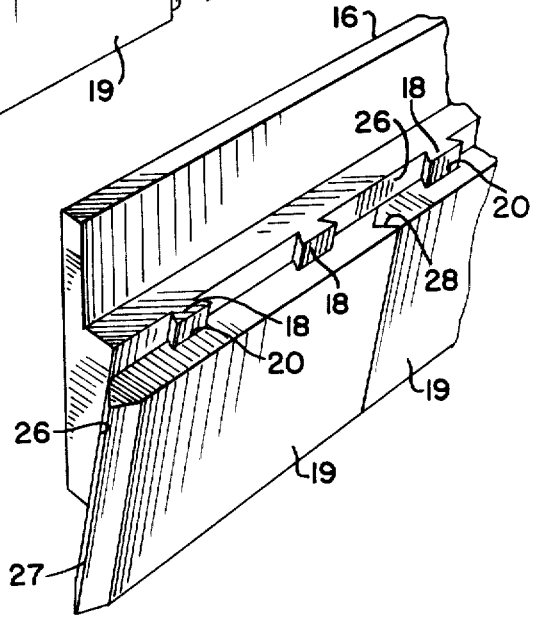
FIG. 7

CONVEYOR SKIRT BOARD AND HOLDER

Matter enclosed in heavy brackets [ ] appears in the original patent but forms no part of this reissue specification; matter printed in italics indicates the additions made by reissue.

This is a Continuation, of application Ser. No. 878,236, filed Feb. 16, 1978 now abandoned.

BACKGROUND OF THE INVENTION

Heretofore, skirt board devices have involved arrangements which because of rapid wear by the moving conveyor belt, necessitated frequent replacement, or constant adjustment which, with the arrangements used, was difficult and because of the continuous wear on the devices it was impossible to maintain an effective and continuous seal between the skirt boards and the moving belt.

It has been the general practice to utilize skirt boarding on conveyors to provide a seal between the moving conveyor belt and the stationary bin, or chute, where material is discharged onto the belt. This particular point is very important to seal because it is here that a great percentage of the dirt encountered throughout a plant finds its source. Material escaping from the conveyor at this loading point becomes scattered throughout the plant and represents a loss of the material conveyed.

Prior skirt boards were constructed from resilient material, such as rubber or the like, and were mounted on the conveyor housing by some means which afforded manual adjustment, in an effort to mate the board with the conveyor belt in some such manner as might form an adequate sealing relationship. The seal was extremely difficult to maintain because of the wear resulting from the abrasion by the constantly traveling conveyor belt and which made the frequent adjustments required, almost impossible for maintenance personnel in the plant to cope with and unless the adjustment was attended to at regular intervals it was not possible to prevent the material from escaping from the conveyor system.

Conventional skirt board installations heretofore have provided arrangements where it was possible to adjust the skirt boards to obtain a sealing engagement with the conveyor belt but generally, these prior skirt boards were bolted in place and it became a major operation to perform the adjustments. The system had to be completely shutdown, the bolts loosened, the skirt boards adjusted and then the bolts retightened and each time an adjustment was required these same steps became necessary to perform and if any resemblance of an effective seal was attempted to be maintained the operation had to be repeated quite frequently.

SUMMARY OF THE INVENTION

The present design for a skirt board installation utilizes an inventive concept which avoids the problems of such prior art devices and overcomes the various shortcomings inherent in the structures heretofore relied upon. This invention provides a skirt board construction comprised of a plurality of interconnected sections which are slidably mounted in mounting plates to be moved toward the conveyor belt for edgewise engagement therewith whereby each section is capable of being adjusted relative to the belt.

These skirt board sections have interlocking connections at their adjoining vertical edges which allow relative vertical movement but constrain the sections for close association with each other. The individual sections are mounted on guides on the mounting plates which permit relative downward movement but retard upward movement of the board sections and such that one or more sections may be removed and replaced without disturbing adjacent sections and if necessary, or desirable, this can be done without the necessity for shutting down the conveyor which would result in a loss of operating time.

The improvements afforded by this invention provide a simple and convenient means for installing the skirt boards and for adjusting them relative to the moving belt. This adjustment can readily be made merely by tapping individual skirt board sections to move them downwardly to positions in engagement with the belt, which can be accomplished without the need for stopping the belt, thus avoiding complete shut-down of the system.

By thus maintaining the sealing relationship between the skirt board and the conveyor belt more or less constant, the escape of material from the belt is prevented and the high labor costs of cleaning up this lost material is avoided. Present EPA rules require that plants be kept very clean and in view of which any material escaping from the conveyor system must be cleaned up and with prior skirt board arrangements it was not possible to work around a moving conveyor belt so that it became necessary to shut down the conveyor system to adjust the skirt in an effort to obtain a more effective seal and to clean up the lost material.

Shutting down the conveyor system for these purposes resulted in a serious loss of valuable production time so that the capability of the present skirt board arrangement to enable the individual skirt board sections to be tapped into engagement with the belt to maintain a maximum sealing condition greatly reduces, or eliminates, the necessity for clean-up operations and stoppage of the conveyor system.

OBJECTS OF THE INVENTION

It is a primary purpose of this invention to provide a sealing installation between a stationary bin, or loading chute, and a traveling conveyor belt which effectively prevents the escape of material and which may be readily adjusted to maintain a substantially continuous sealing relationship with the belt.

The principal object of the invention is the provision of a skirt board installation for conveyors including a plurality of skirt board sections individually adjustable.

An important object of the invention is to provide a skirt board installation for conveyors having a plurality of skirt board sections interlocked together at their adjoining vertical edges and capable of individual relative vertical movement.

Another object of the invention is the provision of a skirt board installation for conveyors including a plurality of skirt board sections having vertical guide means engaged with complemental guide means on a mounting plate whereby the sections may be adjusted vertically relative to the mounting plate and with respect to each other.

Still another object of the invention is to provide a skirt board installation for conveyors including a plurality of skirt board sections having vertical guide means engaged with complimental guide means on a mounting plate for relative vertical movement wherein the guide means on the mounting plate includes means to facilitate downward movement of the skirt board sections but retards upward movement thereof.

A further object of the invention is the provision of a skirt board installation for conveyors including a plurality of skirt board sections having interlocking relationship along their adjoining vertical edges and interlocking relationship between guide means on such skirt board sections and guide means on a mounting plate wherein both such relationships provide for relative vertical movement of the sections with respect to the mounting plate and each other.

A still further object of the invention is to provide a skirt board installation for conveyors including a plurality of skirt board sections mounted for relative vertical sliding movements on a fixed mounting plate and having a recess, or socket, in each section for engagement to remove an individual section from its mounting.

DESCRIPTION OF THE DRAWINGS

The foregoing and other and more specific objects of the invention are attained by the construction and arrangements illustrated in the accompanying drawings wherein FIG. 1 is a general perspective view of a conveyor belt system in association with a stationary bin, or loading chute, and showing the skirt board installation of this invention mounted on the loading chute;

FIG. 2 is a cross-sectional view taken on the line 2—2 of FIG. 1 showing the conveyor belt beneath the bin, or chute, with the skirt boards of this invention engaging the belt at the sides of the bin;

FIG. 3 is sectional view to larger scale showing the skirt board installation in greater detail;

FIG. 4 is a top edge plan view of the skirt board installation on the mounting plate secured on a side wall of the bin utilizing dovetail slide sections;

FIG. 5 is an exploded perspective view of a mounting plate and a plurality of skirt board sections in separated relationship showing horizontal serrations on the dovetail section vertical slides;

FIG. 6 is a detail perspective view of a skirt board section of another form; and FIG. 7 is a detail perspective view of a somewhat modified mounting plate and skirt board sections.

DESCRIPTION OF PREFERRED EMBODIMENT

As shown in FIG. 1, a hopper bin, or chute 10, is mounted to discharge its contents onto a traveling conveyor belt system 11. The conveyor belt runs on rollers 12 located respectively at opposite ends of its reach and the conveyor belt surface is supported by idler rollers 13 which carry the conveying surface in a trough-like shape by reason of the inclined disposition of the side rollers relative to the bottom center roller (see FIG. 2). Rollers 14 at spaced intervals support the under side of the conveyor belt system.

The bin, or chute 10, discharges directly onto the conveyor belt 11 and in order to prevent escape of any material by leakage at the side and rear edges of the chute, a skirt board installation 15 is mounted at these edges to seal these areas against the escape of material deposited on the belt into the surrounding area beyond the conveyor system. The skirt board installation includes a mounting plate 16 adapted to be secured on the face of each side wall of the chute 10, here shown as being rigidly attached by means of welding 17. The mounting plate 16 is provided with a plurality of vertical slides 18 at longitudinally spaced intervals upon which a plurality of separate skirt board sections 19 are adapted to be mounted for relative vertical sliding movements and as best shown in FIGS. 4 and 5, these slides are of dove-tail section whereby to provide an interlocking connection with the skirt board sections which have complementally shaped guideways 20 closely fitting and operatively engaging the slides 18. Thus, the skirt board sections are restrained against relative longitudinal displacement but may be moved vertically on the mounting plate slides 18 without affecting their longitudinal position relative to each other and to the mounting plate 16.

The individual skirt board sections 19 have interlocking connections at their vertical edges with adjoining skirt board sections and these connections take the form of a vertically extending slide 21 of round section on the edge of one skirt board section and a complementally shaped guideway 22 of round shape, on the adjoining skirt board section. This relationship is best indicated in FIGS. 4 and 5. Thus, the individual skirt board sections 19 are adapted to have relative vertical sliding movement with respect to the mounting plate 16 and to each other, without affecting their interlocking relationship with either.

As best shown in FIG. 5, the outer face of each of the vertical slides 18 is provided with horizontal serrations 23 which are shaped to facilitate movement of the skirt board sections 19 in a downward direction but to resist, or retard upward movement thereof, as best indicated in FIG. 3. Thus, as the skirt board sections are adjusted downwardly to engage the belt 11 for more effective sealing purposes, the adjusted position thereof is retained by the serrations engagement with the inner faces of the skirt board sections. It can readily be understood that an individual skirt board section, or for that matter, several such sections, can be removed vertically and replaced without affecting adjoining sections. This is possible because of the relatively vertical sliding movements permitted by the interlocking connections 18/20 and 21/22 between the sections 19 and mounting plate 16 and the adjoining skirt board sections, respectively. To facilitate sliding movement of one or more individual skirt board sections an opening, or recess 24, is provided in the outer face of each such section and when it is necessary, or desirable, to remove one or more sections, a suitable tool can be inserted in the recess 24 for the purpose of prying, or sliding, the section out of the assembly. When inserting a new skirt board section, or when adjusting one or more sections toward the belt, it is necessary merely to tap the top edge of the section with a suitable hammer, or mallet, to drive the individual sections in a generally downward direction for a more effective sealing engagement with the conveyor belt 11. These operations may be performed without shutting down the conveyor, if desired, in view of the simplicity of the operation afforded by this mounting arrangement. Only simple relative sliding movements of the skirt board sections are involved in making these adjustments.

The description of the invention hereinbefore makes reference to relative vertical movements of the skirt board sections with respect to each other and in regard to the mounting plate but it must be pointed out that this does not require that the skirt board sections actually move in a directly vertical direction. The generally vertical movements of the sections may include a component of movement whereby the sections would move toward the conveyor belt, as by means of inclined guideways and slides, disposed at an angle such as would cause the sections to move generally vertically toward the belt.

The mounting plate 16 may be fabricated from metal in the form shown, as preferred, but the skirt board sections 19 are nonmetallic and may be made from rubber, or a suitable plastic material such as might be consistent with the type of service to be encountered with an installation such as herein proposed. The bottom edge of the skirt board rides on the belt 11 and therefore must be capable of withstanding this type of wear. However, the skirt board of this invention is highly adapted to this type of service and may readily be adjusted to compensate for any wear that may occur on the bottom edge of the skirt board sections as a result of the running belt in engagement therewith, merely by tapping the sections on their upper edges with a hammer, or the like, to move them downwardly, as necessary, to take up any developed clearance, which otherwise might result in leakage of the discharged material.

MODIFIED SKIRT BOARD EMBODIMENT

As illustrated in FIG. 6 a modification of the skirt board sections 19 is shown wherein the skirt board sections are of the same general dimensions as before and have similar slide and guideway features 21 and 22, respectively, of round section, at their opposite side edges and an actuating recess 24 in the front face thereof. However, this skirt board section utilizes a slide arrangement and guideway for association with the mounting plate that is similar to the slide and guideway arrangement 21/22 of round section whereby all of the slides and complemental guideways are of similar round section. The skirt board section on its inner face is provided with a pair of longitudinal spaced guideways 25 of round shape designed to be complemental to a slide of round section on a modified mounting plate (not shown).

In this form of the invention the round section which slides on the mounting plate 16 may also be constructed to retard upward movement of the skirt board sections 19 once adjustment thereof has been attained. For this purpose the round section sliding on the mounting plate may comprise threaded rod sections secured on the face of the mounting plate 16 by welding or the like. The guideways 25 in the skirt board sections which engage the slides on the mounting plate may be smooth on their inner surfaces or they might be provided with generally horizontal ribs on their rounded inner surfaces which would relate to the threaded portions on the round slides in a manner to retard upward movement of the skirt board sections once they have been adjusted downwardly into positions bearing on the conveyor belt 11.

The skirt board sections 19 of this type will function relative to a mounting plate and in respect to each other just as the preferred form does but the modified arrangement facilitates manufacture inasmuch as all of the slides and guideways are of similar design.

MODIFIED SKIRT BOARD AND MOUNTING PLATE

FIG. 7 illustrates a further modification of the skirt board installation which involves changes in the mounting plate as well as the skirt board section. The outer face 26 of the mounting plate 16 slopes inwardly from top to bottom so that the dovetail slides 18 on this face are inclined at an inward angle whereby the skirt board sections 19 mounted on the mounting plate by means of the slides 18 are complemental guideways 20 in the skirt board sections, are disposed at a similar inclination and engage the conveyor belt 11 at this angle. The skirt boards are movable toward or away from the belt on the slides 18 at the angle of the front surface 26 in making any adjustment of the skirt board sections relative to the conveyor belt.

The skirt board sections 19 in this form of the invention incorporate a modified slide and guideway arrangement of their side edges which may be described as V-shaped. Each skirt board section 19 has a V-shaped slide 27 on one side edge, a complementally V-shaped guideway 23 on the opposite side edge so that, in operative position, adjoining skirt board sections interlock against relative lateral displacement just as in the previous forms of the invention and are relatively slidable in the same manner as the previously described versions.

SUMMARY

From the foregoing it will be seen that there has been provided a skirt board installation for use with a conveyor belt wherein individual skirt board sections are independently movable toward or away from the conveyor belt for adjustment, or removal and replacement and wherein the skirt board sections have interlocking engagement with a mounting plate and with respect to each other to maintain operative relationship while permitting adjustment of one or more sections without the necessity for shutting down the conveyor operation. The interlocking connections between skirt board sections and with respect to the mounting plate afford advantages not heretofore available in maintaining alignment of the skirt board sections and independent adjustment and renewal.

What is claimed is:

[1. A skirt board installation for a conveyor having a travelling belt including a mounting plate secured on the vertical walls of a conveyor loading chute, a plurality of skirt board sections capable of contacting said belt, means individually and adjustably mounting said skirt board sections on said mounting plate to permit adjustment of each section toward said belt and to retard movement of each section away from said belt, and said skirt board sections each including generally vertical slides and guideways along their adjoining edges allowing for said adjustment and said movement.]

[2. A skirt board installation as in claim 1 wherein the individual mounting means comprises cooperating generally vertical guideways and slides allowing for said adjustment of the sections toward said belt.]

[3. A skirt board installation as in claim 2 wherein said cooperating guideways and slides include the means to retard movement of the sections away from the belt.]

4. A skirt board installation for a conveyor having a travelling belt including a mounting plate secured on at least one of the vertical walls of a conveyor loading chute, at least one skirt board section connectible to said mounting plate, a slide and guideway interlocking connection disposed between said mounting plate and said skirtboard section allowing generally vertical movement of said skirt board section with respect to said mounting plate and friction means disposed between said mounting plate and said skirt board section adapted to permit sliding of said skirt board section toward said conveyor but to retard movement of said skirt board section away from said belt, said friction means being disposed in said slide and guideway connection.

5. A skirt board installation as in claim 4 including a plurality of skirt board sections slidable with respect to said mounting plate.

6. A skirt board installation as in claim 5 including means connecting adjacent skirt board sections which allow for relative vertical movement with respect to each other.

7. A skirt board installation as in claim 4 in which at least one mounting plate and at least one skirt board section is mounted on a plurality of said vertical walls of said loading chute.

8. A skirt board installation as in claim 5 wherein said skirt board sections are each removable and having a notch to assist in removing each skirt board section upwardly from between adjoining skirt board sections.

9. A skirt board installation as in claim 6 wherein said skirtboard sections have interlocking slides and guideways along their respectively adjoining side edges allowing relative vertical sliding movements of the several sections.

10. A skirt board installation as in claim 4 wherein said slides each include an outwardly disposed flat face on the respective projecting slides and each includes serrations on said face disposed to resist sliding movement of the skirt board sections away from said belt.

*11. A skirt board installation for a conveyor having a traveling belt including at least one mounting plate; a plurality of skirt board sections disposed above said belt and adapted to contact said belt and connectible to said mounting plate; a slide and guideway interlocking connection between said mounting plate and said skirt board sections allowing generally vertical movement of said skirt board sections with respect to said mounting plate; and friction means disposed in said slide and guideway connection between said mounting plate and said skirt board section adapted to permit sliding of said skirt board section toward said conveyor but to retard movement of said skirt board section away from said belt.*

*12. A skirt board installation as in claim 11 including means connecting adjacent skirt board sections which allows for relative vertical movement of each with respect to the other.*

* * * * *